(12) United States Patent
Tate et al.

(10) Patent No.: US 11,390,550 B2
(45) Date of Patent: *Jul. 19, 2022

(54) TREATMENT OF OIL SANDS TAILINGS WITH LIME AT ELEVATED PH LEVELS

(71) Applicant: Graymont Western Canada Inc., Richmond (CA)

(72) Inventors: Michael John Tate, Oregon, OH (US); Jared Ira Leikam, West Jordan, UT (US); Jesse Wayne Fox, West Valley City, UT (US); Nikolas Andrei Romaniuk, Edmonton (CA)

(73) Assignee: Graymont Western Canada Inc., Richmond (CA)

( * ) Notice: Subject to any disclaimer, the term of this patent is extended or adjusted under 35 U.S.C. 154(b) by 209 days.

This patent is subject to a terminal disclaimer.

(21) Appl. No.: 16/840,052

(22) Filed: Apr. 3, 2020

(65) Prior Publication Data

US 2020/0239349 A1 Jul. 30, 2020

Related U.S. Application Data

(63) Continuation of application No. 15/681,282, filed on Aug. 18, 2017, now Pat. No. 10,647,606.

(51) Int. Cl.
*C02F 11/122* (2019.01)
*C02F 1/52* (2006.01)
(Continued)

(52) U.S. Cl.
CPC .......... *C02F 11/122* (2013.01); *C02F 1/5236* (2013.01); *C02F 11/121* (2013.01);
(Continued)

(58) Field of Classification Search
CPC .............. C02F 2103/10; C02F 2209/06; C02F 1/5236; C02F 11/121; C02F 11/122; C02F 11/143; C02F 11/145
See application file for complete search history.

(56) References Cited

U.S. PATENT DOCUMENTS 3,502,575 A 3/1970 Hepp et al.
3,859,799 A 1/1975 Jaco
(Continued)

FOREIGN PATENT DOCUMENTS

CA 1138361 A 12/1982
CA 1291957 11/1991
(Continued)

OTHER PUBLICATIONS

BGC Engineering, Inc., "Oil Sands Tailings Technology Review", Oil Sands Research and Information Network, University of Alberta, School of Energy and the Environment, Edmonton, Alberta. OSRIN Report No. TR-1, Jul. 2010.
(Continued)

*Primary Examiner* — Ryan B Huang
(74) *Attorney, Agent, or Firm* — Perkins Coie LLP (57) ABSTRACT

Methods and systems for treating oil sands tailings streams at an elevated pH using lime are disclosed herein. In some embodiments, the method comprises providing a tailings stream including 10-55% solids by total weight, increasing the pH of the tailings stream by combining the tailings stream with lime to produce a lime-tailings mixture having a pH of at least 11.0, and dewatering the lime-tailings mixture to produce a first stream having 10% or less solids by total weight and a second stream having 50% or more solids by total weight. The first stream can correspond to a release water stream, and the second stream can correspond to a cake. The lime slurry can include about 10% lime by total weight, and can comprise lime hydrate, quicklime, or a combination thereof. Dewatering the lime-tailings mixture can include routing the lime-tailings mixture to a centrifuge unit and/or a pressure or vacuum filtration unit.

20 Claims, 7 Drawing Sheets

(51) Int. Cl.
*C02F 11/127* (2019.01)
*C02F 11/145* (2019.01)
*C02F 11/121* (2019.01)
*C02F 11/143* (2019.01)
*C02F 103/10* (2006.01)

(52) U.S. Cl.
CPC .......... *C02F 11/127* (2013.01); *C02F 11/143* (2019.01); *C02F 11/145* (2019.01); *C02F 2103/10* (2013.01); *C02F 2209/06* (2013.01); *C02F 2301/046* (2013.01); *C02F 2303/18* (2013.01)

(56) References Cited

U.S. PATENT DOCUMENTS

| | | | |
|---|---|---|---|
| 4,173,532 | A | 11/1979 | Keoteklian |
| 4,225,433 | A | 9/1980 | Liu et al. |
| 4,229,295 | A | 10/1980 | Krofchak |
| 4,240,897 | A | 12/1980 | Clarke |
| 4,282,103 | A | 8/1981 | Fuhr et al. |
| 4,409,091 | A | 10/1983 | Kessick |
| 4,414,117 | A | 11/1983 | Yong et al. |
| 5,118,219 | A | 6/1992 | Walker |
| 5,575,922 | A | 11/1996 | Green et al. |
| 5,846,314 | A | 12/1998 | Golley |
| 6,267,250 | B1 | 7/2001 | Leung et al. |
| 7,695,612 | B2 | 4/2010 | Erasmus et al. |
| 10,369,518 | B2 | 8/2019 | Tate et al. |
| 10,647,606 | B2 * | 5/2020 | Tate ..................... C02F 11/122 |
| 2011/0042319 | A1 | 2/2011 | Remy |
| 2011/0192769 | A1 | 8/2011 | Garland |
| 2012/0145646 | A1 | 6/2012 | Bae et al. |
| 2013/0019780 | A1 | 1/2013 | Karimi et al. |
| 2013/0187087 | A1 | 7/2013 | Scheurman |
| 2013/0206702 | A1 | 8/2013 | Lin et al. |
| 2014/0054231 | A1 * | 2/2014 | Spence ..................... C02F 1/56 210/729 |
| 2014/0072653 | A1 | 3/2014 | Buschmann |
| 2014/0116946 | A1 | 5/2014 | Mikula et al. |
| 2015/0034530 | A1 | 2/2015 | Speirs et al. |
| 2016/0304366 | A1 | 10/2016 | Moore et al. |
| 2017/0182431 | A1 | 6/2017 | Gupta et al. |
| 2018/0065887 | A1 | 3/2018 | Ingram et al. |
| 2018/0099883 | A1 | 4/2018 | Wilson et al. |
| 2019/0055149 | A1 | 2/2019 | Tate et al. |
| 2019/0135663 | A1 | 5/2019 | Tate et al. |
| 2020/0079664 | A1 | 3/2020 | Leikam et al. |

FOREIGN PATENT DOCUMENTS

| | | |
|---|---|---|
| CA | 2188064 A1 | 4/1998 |
| CA | 2522031 C | 2/2013 |
| CA | 2824543 A1 | 2/2014 |
| CA | 2792786 A1 | 4/2014 |
| CA | 2825513 A1 | 4/2014 |
| CA | 2977524 A1 | 2/2018 |
| KR | 1020080054335 A | 6/2008 |
| WO | 2013096787 A1 | 6/2013 |
| WO | 2017143441 A1 | 8/2017 |

OTHER PUBLICATIONS

Chalaturnyk et al., "management of oil sands tailings", Petroleum Science and Technology, 2002, vol. 20, Nos. 9&10, pp. 1025-1046.
CNRL Presentation "Lime Coagulation of Oil Sand Tailings" Feb. 19, 2017.
International Search Report and Written Opinion dated Jan. 21, 2019, International Application No. PCT/ US2018/000228, 14 pages.
Lime in MFT Exploratory Work Presentation "Current Work on Lime Addition to MFT" Oct. 11, 2016.
Morgenstern Presentation "Lime as a Coagulant" Graymont Inc., Apr. 26, 2017.
Romaniuk et al., "Effect of Lime Coagulation on Strength and Atterberg Properties of Clays in Oil Sands Tailings" Clay Mineral Society Conference, Jun. 7, 2017.
Stagegate Presentation "Texas A&M Update" May 18, 2017.
Tate M., et al. "Impacts of Calcium Compounds on Oil Sands Water Chemistry" 2016 White Paper.

* cited by examiner

TREATMENT OF OIL SANDS TAILINGS WITH LIME AT ELEVATED PH LEVELS

CROSS-REFERENCE TO RELATED APPLICATION

This application is a continuation of U.S. patent application Ser. No. 15/681,282, filed Aug. 18, 2017, which is incorporated herein by reference in its entirety.

TECHNICAL FIELD

This application relates to systems and methods for dewatering oil sands tailings. In particular, oil sands tailings are mixed with a lime additive to promote dewatering of the oil sands tailings.

BACKGROUND

The extraction of bitumen from oil sands has been traditionally performed using the Clark Hot Water Extraction (CHWE) process. A tailings slurry, defined as whole tailings, is produced as a byproduct of the CHWE process, and can include water, sand, clay, and residual bitumen particles that are suspended in the extraction process water. Coarse sand particles (e.g., >44 µm) can be easily removed from whole-tailings, but removal of finer particles (fines) can be more problematic. A portion of the remaining fines, water, and residual bitumen form a slurry that is about 10-15% solids by mass, which after a number of years can settle to be about 20-30% solids by mass. This slurry is referred to as fluid fine tailings (FFT) and/or mature fine tailings (MFT), and can remain for decades in a fluid state without further aggregation or settling. Slow consolidation, limited solids strength, and poor water quality of the FFT/MFT limits options for reclamation and has resulted in the formation of large tailings ponds.

A number of different technologies have been tried to improve the reclamation of FFT/MFT. Some of these technologies include whole-tailings treatment, non-segregating tailings (NST) production, composite tailings (CT) production, tailings reduction operations (TRO), atmospheric drying, or treatment with polymers. These methods, however, have worked with only limited success, as there currently exists over a billion cubic meters of FFT/MFT in tailings ponds. As such, there is a need for an improved method and process to treat oil sands tailings to provide an effective reclamation option.

DETAILED DESCRIPTION

A method and system of dewatering oil sands tailings using a lime additive is described in detail herein in accordance with embodiments of the present technology. Numerous specific details are set forth in the following description and figures to provide a thorough and enabling description of embodiments of the technology. One skilled in the relevant art, however, will recognize that the technology can be practiced without one or more of the specific details. In other instances, well-known structures or operations are not shown or are not described in detail to avoid obscuring aspects of the technology. In general, alternatives and alternate embodiments described herein are substantially similar to the previously described embodiments, and common elements are identified by the same reference numbers.

Figure 1:
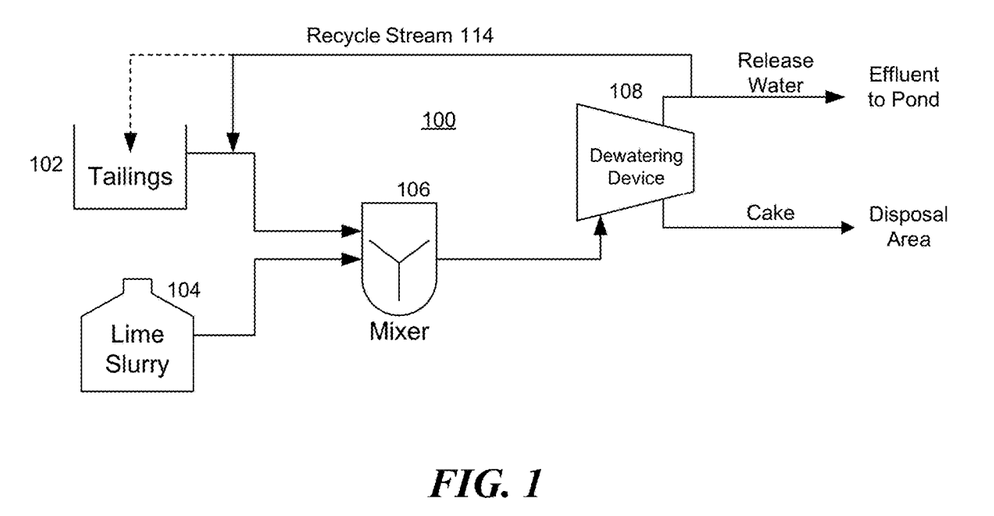
FIG. 1 is a schematic flow diagram of an oil sands tailings dewatering system, configured in accordance with an embodiment of the present technology.

FIG. 1 is a schematic flow diagram of an oil sands tailings dewatering system 100 ("system 100"). The system 100 includes a tailings holding reservoir 102 (e.g., a pond, diked area, tank, etc.) including oil sands tailings, and a lime holding reservoir 104 (e.g., a tank) including a lime slurry (e.g., a lime additive). The oil sands tailings can include whole-tailings (WT), thin fluid tailings (TFT), fluid fine tailings (FFT) and/or mature fine tailings (MFT) (referred to collectively as "tailings"), and can have a solids content of about 10-45 wt. %. The lime slurry includes a liquid (e.g., water) and a lime additive. The lime additive is less than 15 wt. % of the lime slurry, and is composed of inorganic materials that provide divalent (e.g., calcium) for coagulation of tailings. The tailings stream in the tailings holding reservoir 102 is slightly alkaline, having a pH level of about 7.5-8.5, and the lime slurry in the lime holding reservoir is alkaline, having a pH level greater than or equal to about 12.0. The tailings and lime slurry are each directed to a mixing apparatus 106 (e.g., a mixer) where they are combined to produce a lime-tailings mixture having a pH of at least 11.0. In some embodiments, the pH of the lime-tailings mixture varies from about 11.0-13.0, about 11.5-12.5. The lime-tailings mixture is then moved to a dewatering device 108 to promote dewatering of the lime-tailings mixture. As explained in further detail below, the dewatering device 108 can include a centrifuge, and/or a pressure or vacuum filtration system that separates the lime-tailings mixture into a first stream (e.g., a centrate or a filtrate) substantially comprising release water, and a second stream substantially comprising solids (e.g., a "cake"). The first stream including the release water centrate or filtrate can include a solids content less than about 5 wt. %. The first stream can be directed to a pond and/or recycled back into the system 100 to be combined with the tailings stream prior to being mixed with the lime slurry. The recycled portion of the release water can include soluble calcium cations previously injected as part of the lime slurry, and thus can decrease the amount of additional lime in the lime slurry needing to be injected to the mixing apparatus 106. The second stream can include a solids content greater than about 55 wt. %. For example, the second stream can include a solids content from about 55-75 wt. %. The second stream can be collected and transported using a truck, belt, and/or other conveying systems to an external site (e.g., a temporary storage or reclamation area).

The tailings stored in the tailings holding reservoir 102 can include water, sand, silt, clay, and residual bitumen particles that are suspended in the extraction water. The tailings can be obtained from tailings ponds or the oil sands extraction process directly. As previously described, the tailings may be stored in a tailings pond and include a settled solids content of about 10-45 wt. %. More specifically, the tailings can include a mineral solids content from about 30-40%, a bitumen content from about 1-3%, a clay content from about 60-80%, and a pH from about 7.5-8.5. Prior to being held in the holding reservoir 102, the tailings may undergo upstream processing, such as cyclone separation, screen filtering, thickening and/or dilution. The tailings stream entering the mixing apparatus 106, after potentially being combined with recycled water 114, is preferably above 20 wt. % solids.

The lime slurry holding reservoir 104 can include an agitated tank. The lime slurry additive stored in the lime holding reservoir 104 can include calcium-containing inorganic materials that provide divalent calcium cations for coagulation of tailings. As such, the lime slurry comprises a lime product including hydrated lime (e.g., calcium hydroxide ($Ca(OH)_2$)), quicklime (e.g., calcium oxide (CaO)), or enhanced hydrated lime. The enhanced hydrated lime includes particles with BET surface areas exceeding 30 $m^2/g$. In some embodiments, the lime slurry can include dolomitic lime (e.g., lime including at least 25% magnesium), other lime-containing materials, or a combination of quicklime, limestone, hydrated lime, enhanced hydrated lime, dolomitic lime, and/or other lime-containing materials. In the lime manufacturing process, limestone (e.g., calcium carbonate ($CaCO_3$)), is crushed to ½" to 2" particles used as kiln feed. The kiln feed is then calcined, which converts the limestone particles into calcium oxide, which is sometimes referred to as quicklime. Introducing water to the quicklime leads to the formation of fine particles of hydrated lime, which is often referred to using the generic term "lime." In some embodiments, the lime additive is in a solidified form. For example, the lime additive may be a powder that is formed by crushing or pulverizing larger pieces of a lime-based solid (i.e., quicklime, limestone, hydrated lime, enhanced hydrated lime, dolomitic lime, or any combination thereof). The lime additive is combined with a liquid, such as water, to form the lime slurry. For example, the lime slurry can compromise less than about 15 wt. % lime, less than about 10 wt. % lime, or less than about 5 wt. % lime.

The tailings and the lime slurry additive are combined in the mixer 106 to produce the lime-tailings mixture. The mixer 106 can include a holding tank and means to agitate the lime-tailings mixture, such as rotating blades. In some embodiments, the mixer 106 can include a static mixer, a dynamic mixer, or a T mixer. The residence time in the mixer 108 for particles of the lime-tailings mixture can vary from at least about 90 seconds, to at least about 5 minutes, to at least about 10 minutes, or to at least about 20 minutes. In general, the mixer 106 mixes the lime-tailings mixture to ensure the lime-tailings mixture leaving the mixer 106 is well mixed and has a desired pH. The pH of the lime-tailings mixture determines the reactions occurring within the mixer (e.g., cation exchange and/or pozzolanic reactions), as described in more detail below. The pH of the lime-tailings mixture at the outlet of the mixer can be measured and used to increase or decrease the pH of the lime-tailings mixture by (a) increasing or decreasing the feed rate of the lime slurry, and/or (b) increasing or decreasing the residence time of the particles of the lime-tailings mixture. As will be discussed in greater detail below, the dewatering rate of the lime-tailings mixture is affected by the pH level of the lime-tailings mixture, and increasing the pH level of the lime-tailings mixture by, for example, increasing the amount of lime slurry can result in an increased dewatering rate of the lime-tailings mixture. In some embodiments, other additives (e.g., polymers, defoamers), can also be included in the lime-tailings mixture to facilitate the dewatering process. In these embodiments, the pH of the lime-tailings mixture is 11.0 or greater.

The lime-tailings mixture is directed, via gravity and/or a pump, from the mixer 106 to the dewatering device 108. As previously mentioned, the dewatering device 108 can include a centrifuge, a filtration system and/or other similar systems that can provide a physical force on the lime-tailings mixture to promote dewatering. The centrifuge separates the lime-tailings mixture into release water (e.g., a centrate) and cake. In some embodiments, the centrifuge includes a scroll centrifugation unit. In other embodiments, the centrifuge may be a solid bowl decanter centrifuge, screen bowl centrifuge, conical solid bowl centrifuge, cylindrical solid bowl centrifuge, a conical-cylindrical solid bowl centrifuge, or other centrifuges used in the relevant art. The filtration system can also separate the lime-tailings mixture into release water and cake, and can include a vacuum filtration system and/or pressure filtration system to separate the release water from the cake. In general, the dewatering device 108 may be another type of filtering apparatus known in the relevant art that utilizes any desired filtration process. In some embodiments, the filtration system can include a Whatman 50, 2.7 micron filter and can subject the lime-tailings mixture to about 100 psig of air pressure.

The lime-tailings mixture may be transferred to the centrifuge or filter immediately after the mixing process has completed or may be retained for a period of time to allow the dewatering process enough time to proceed. In some embodiments, the lime-tailings mixture may be retained for one hour or less. In other embodiments, the lime-tailings mixture may be retained for more than one hour (e.g., one day, one week, one month, etc.). In general, the lime-tailings mixture may be retained for any desired amount of time to ensure that the lime-tailings mixture has been modified enough for the centrifuge and/or filter to separate a sufficient amount of water from the solids in the lime-tailings mixture.

The dewatering device 108 has a first outlet used to transfer the separated release water, and a second outlet that is used to transfer the separated cake. The separated cake is a soft solid that is composed of the particulate matter found in the tailings, such as sand, silt, clay, and residual bitumen. The lime additive particles and some residual water does not get removed during the dewatering process. As previously mentioned, the cake can include at least 55 wt. % solids. In other embodiments, the cake can include at least about 60% wt. % solids, at least about 65% wt. % solids, at least about 70% wt. % solids, at least about 80% wt. % solids, at least about 85% wt. % solids, or at least about 90% wt. % solids. In general, the cake may include a greater percentage of solids by weight than the percentage of liquids by weight.

The separated release water includes water found in the oil sands tailings and any water that may be found in the lime slurry. The separated release water may also contain some solid particulate matter that is not separated from the water during the dewatering process, such as sand, silt, clay, and residual bitumen, and the lime additive. In one embodiment, the release water includes less than about 5 wt. % solids. In other embodiments, the release water can include less than about 10 wt. % solids, less than about 4 wt. % solids, or less than 1 wt. % solids. In general, the release water includes a significantly greater percentage of water by weight than the percentage of solids by weight.

The release water may be directed to a number of different applications. For example, the release water may be (a) recycled back to the tailings treatment process, or (b) used to pretreat extraction process water. The release water can be treated with carbon dioxide to reduce the pH and amount of soluble calcium cations present therein. This can be done via natural absorption of bicarbonates (e.g., by carbon dioxide present in the atmosphere), or by actively injecting carbon dioxide. In some embodiments wherein the release water is recycled back to the tailings treatment process, at least a portion of the release water is recycled and added into the tailings holding reservoir 102 or the tailings stream being transferred to the mixer 106. The recycled release water mixes with the tailings prior to being combined with the lime slurry. Adding the recycle water 114 to the tailings stream prior to the mixer 106 increases the pH level of the tailings because the recycle water includes soluble calcium cations that were not removed during the dewatering process, and is thus alkaline. As will be discussed in greater detail below, the recycle water 114 includes calcium ions that will readily react with carbonates present in the tailings stream to form insoluble compounds that precipitate out of solution and separate from the suspended tailings. Using recycle water 114 to reduce the amount of bicarbonates in the tailings reduces the amount of the lime slurry needed for enhanced dewatering to occur, which in turn reduces the cost of the overall dewatering process. In some embodiments, using recycle water 114 to increase the pH level of the oil sands tailings can be omitted and the oil sands tailings dewatering system 100 may not use any portion of the release water during the dewatering process.

Figure 2:
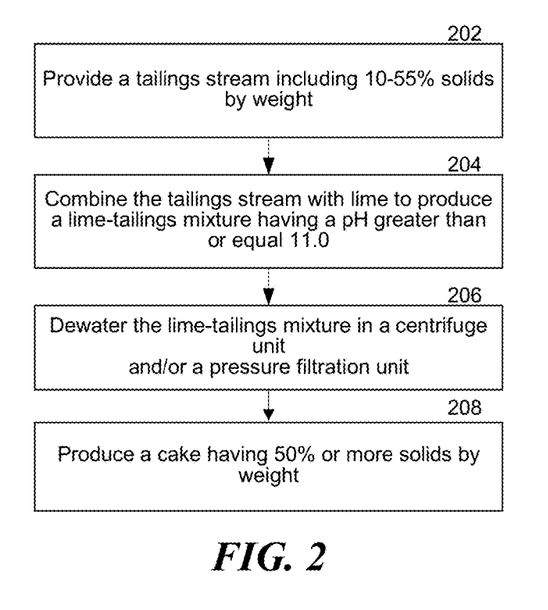
FIG. 2 is a block diagram of a method of dewatering an oil sands tailings stream, configured in accordance with an embodiment of the present technology.

FIG. 2 is a block diagram of a method 200 of dewatering a tailings stream, configured in accordance with an embodiment of the present technology. Process portion 202 includes providing a tailings stream to a dewatering system (e.g., the system 100). The tailings stream can have a composition similar to the tailings stream previously described. The tailings stream may operate as a steady state system having a constant feed or as a batch stream in which tailings are provided to the system at regular intervals.

Process portion 204 includes adding a lime additive, such as quicklime, limestone, hydrated lime, or dolomitic lime to the tailings stream to form a lime-tailings mixture. Adding the lime additive to the tailings stream increases the pH of the tailings stream, which increases the rate of the dewatering process and the solid wt. % of the cake. Specifically, the calcium hydroxide ions increase the pH of the tailings stream and provide divalent cations that modify and affect the stability of fine clay soils in the tailings. Kaolinite ($Al_2Si_2O_5(OH)_4$) is a type of clay typically found in the oil sands tailings. As the pH increases above 11.5, the calcium cations from lime are more soluble due to the depletion of bicarbonates in process water. Above this pH, these soluble calcium cations can replace cations such as sodium and potassium on the surface of the clay. As pH levels increase above 12.0, a chemical modification of the clay's surface occurs by pozzolanic reactions. In pozzolanic reactions, soluble calcium cations from the lime react with silicic acid ($Si(OH)_4$) and aluminate ($Al(OH)_4^-$) functional groups from the Kaolinite to form calcium silicate hydrate ($CaH_2SiO_4 \cdot 2H_2O$) and various aluminum hydrates, such as calcium aluminate hydrate. After being chemically modified, the fine Kaolinite particles grow in size, decrease their water layer and can be separated from the water using a centrifuge or filter, as previously described.

The cation exchange and pozzolanic reactions between Kaolinite and lime do not readily occur if the pH level of the lime-tailings mixture is below about 11.5 because the lime-tailings mixture lacks soluble $Ca^{2+}$ cations to react with the Kaolinite. Calcium cations from lime additives are consumed by reactions with bicarbonates at lower pH. This is different than other calcium cations like gypsum and calcium chloride that have partially soluble calcium cations at lower pH. For example, when sodium bicarbonate is exposed to calcium hydroxide, calcium cations bond with carbonate ions and sodium bicarbonate is converted to sodium carbonate ($Na_2CO_3$), as seen in Reaction 1:

$$Ca(OH)_2 + 2NaHCO_3 \rightarrow CaCO_3 + Na_2CO_3 + 2H_2O \quad (1)$$

The calcium hydroxide will also readily react with the sodium carbonate formed during Reaction 1 to form additional calcium carbonate and sodium hydroxide (NaOH), as seen in Reaction 2:

$$Ca(OH)_2 + 2Na_2CO_3 \rightarrow CaCO_3 + 2NaOH \quad (2)$$

The calcium carbonate formed during Reactions 1 and 2 will precipitate out of solution into solid particulate matter. Potassium bicarbonate will undergo similar reactions with calcium hydroxide. In addition to the bicarbonates found in the oil sands tailings, atmospheric carbon dioxide ($CO_2$) will dissolve in water that has an alkaline pH level to form carbonic acid ($H_2CO_3$), which reacts with calcium hydroxide to form calcium carbonate and water, as shown in Reactions 3 and 4:

$$CO_2 + H_2O \rightarrow H_2CO_3 \quad (3)$$

$$Ca(OH)_2 + H_2CO_3 \rightarrow CaCO_3 + 2H_2O \quad (4)$$

While Reactions 3 and 4 reduce the amount of calcium cations available for cation exchange and pozzolanic reactions to occur, the concentration of carbon dioxide in the atmosphere is relatively low, and Reactions 3 and 4 require longer periods of time to have an effect on the concentration of free calcium cations in the lime-tailings mixture under atmospheric conditions. Reactions 1 and 2, on the other hand, are limited only by the availability of carbonate ions in the lime-tailings mixture and occur significantly more readily than cation exchange or pozzolanic reactions, which means that there are very few free calcium cations available to react with the Kaolinite. However, as the amount of lime additive added to the lime-tailings mixture increases, the pH level of the mixture will eventually approach about 11.0 and the concentration of carbonate ions in the mixture will approach zero. At this point, the number of free and soluble calcium cations in the water will increase.

As the pH level of the mixture increases to 11.0 or higher, settling of the solid particulate matter in the lime-tailings mixture also increases. However, the dewatering rate of the mixture is still limited at that pH. Only once the pH level of the mixture reaches a pH level greater than 12.0, and preferably about 12.3, will pozzolanic reactions between the dissolved calcium cations and the clay particulate matter occur which results in improved dewatering. As such, more lime additive may be required to increase the pH level of the mixture above 12, so that pozzolanic reactions between the soluble calcium and clay components can begin.

In systems where the oil sands tailings stream is provided as a continuous flow of oil sands tailings, the lime additive may be a continuous flow of lime additive that is added and mixed into the oil sands stream. In systems where the oil sands tailings stream is provided as batches of oil sands tailings, the lime additive may also be added and mixed into the oil sands in individual batches in tandem with the oil sands tailings batches.

After the lime-tailings mixture has been thoroughly mixed, the method proceeds to process portion 206, where the lime-tailings stream is dewatered by separating the solid material from the liquid components in the lime-tailings stream. As previously described, the lime-tailings stream dewatering process using a centrifuge and/or filter to forcibly separate the solid material in the lime-tailings stream from the liquid components. Specifically, the centrifuge and/or filtration system provide a driving force that promotes dewatering via the cation exchange and pozzolanic reactions previously described. In other embodiments, the lime-tailings stream is dewatered using a tailings pond to allow the lime-tailings stream to dewater over time without the use of additional machinery.

After dewatering, the method proceeds to process portion 208 in which the dewatering system produces a cake with a solids content of at least 55 wt. %. The solids in the cake are typically sand, silt, clay, residual bitumen, and the lime additive, along with any other solid particulate matter that is present in either the lime-tailings stream or lime slurry additive. The balance of the cake is composed primarily of water that was introduced in either the tailings or lime slurry streams. As previously described, the dewatering system also produces a release water stream that is formed from the tailings water from which the solids are separated. Converting the solid material found in the oils sands tailings stream into a stream of cake that is at least 55% solids by weight enables significantly easier storage, transport, disposal and/or reclamation of the solid than when the solid material was trapped in suspension in the oil sands tailings stream.

Figure 3:
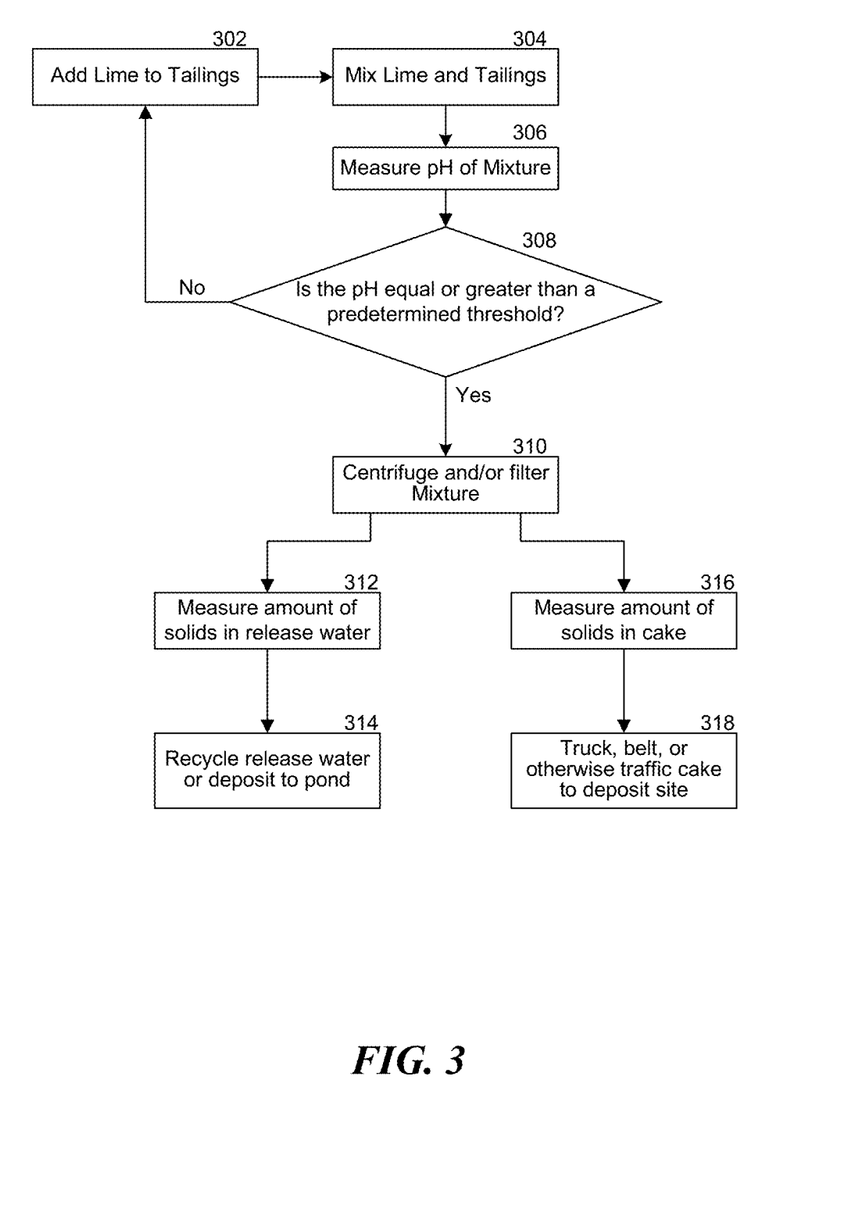
FIG. 3 is a flowchart of a method of dewatering an oil sands tailings stream, configured in accordance with another embodiment of the present technology.

FIG. 3 is a schematic flow diagram of a method 300 of dewatering an oil sands tailings stream. Specifically, the method 300 uses pH as a process control parameter to promote dewatering. Characteristics of oil sands ore, such as the sand to fine ratio, can change significantly. It has been difficult to control the dosage of coagulants and flocculants in oil sands mining operations because measurement of these changes in the tailings treatment process is difficult. As seen in FIG. 2, measurement of pH can be used as an effective method to understand the proper dose of lime that is required for dewatering. At step 302, a lime additive is added to oil sands tailings, as previously described. At step 304, the lime additive and the oil sands tailings are mixed together to form a uniform mixture. If desired, step 304 may be performed using a mixer to ensure that the mixture is uniform. At step 306, the pH level of the lime-tailings mixture is measured and at step 308 the measured pH level is compared to a predetermined threshold pH level to see if the measured pH level is greater than or equal to the predetermined threshold pH level. As previously mentioned, the dewatering rate of the oil sands tailings is at least partially dependent on the pH level of the oil sands tailings.

The predetermined threshold pH level is greater than about 11.0. In some embodiments, the predetermined threshold pH level is about 11.5-13.0, or about 12.2. If the measured pH level of the lime-tailings mixture is not greater than or equal to the predetermined threshold pH level (e.g., it is less than the predetermined threshold pH level), the method reverts back to step 302 to add additional lime to the lime-tailings mixture to further increase the pH level. This cycle continues until the pH level of the lime-tailings mixture is greater than the predetermined threshold pH level. When the measured pH level of the lime-tailings mixture is greater than or equal to the predetermined threshold pH level, the method proceeds to step 310. At step 310, the lime-tailings mixture is transferred to a centrifuge (or filter), which centrifuges (or filters) the lime-tailings mixture to separate the solids from the water and produces release water and cake as separate outputs.

After the centrifuging (or filtering), the method proceeds to either step 312 and step 316. At step 312, the system measures the amount of solids remaining in the release water. At step 316, the system determines the amount of solids in the cake. If the measured amount of solids remaining in the release water is too high or if the measured amount of solids in the cake is too low, the system may adjust the operating parameters of the system to ensure that the desired level of separation occurring. In one embodiment, the system determines that if the amount of solids remaining in the release water output from the centrifuge (or filter) is at or below a given threshold. If the amount of solids in the release water is at or below the given threshold, the method proceeds to step 314. If not, the system may adjust the operating parameters of the system by increasing the amount of time that the mixture rests for before being transferred to the centrifuge/filter, may make a lime slurry dose adjustment and/or may adjust the operating parameters of the centrifuge/filter. In another embodiment, the system determines if the amount of solids remaining in the cake that is output from the centrifuge (or filter) is at or above a given threshold. If the amount of solids in the cake is at or above the given threshold, the method proceeds to step 318. If not, the system may adjust the operating parameters of the system by increasing the amount of time that the mixture rests for before being transferred to the centrifuge/filter, make a lime slurry dose adjustment and/or may adjust the operating parameters of the centrifuge/filter. By constantly adjusting the operating parameters of the system when the release water or cake output by the centrifuge/filter do not meet the desired threshold requirements, the system is able to ensure that later batches of lime-tailings mixture (or later portions of the same lime-tailings mixture stream that have yet to be processed for systems that operate continuously) will meet the desired threshold requirements.

At step 314, the release water is either recycled, by being added to the oil sands tailings stream prior to the introduction of the lime additive in step 302, as previously discussed, or is deposited into a pond for storage. In an alternative embodiment, the release water is treated with carbon dioxide injection prior to being deposited into a pond. As will be discussed in greater detail below, carbon dioxide readily reacts with calcium cations and exposing the release water to carbon dioxide can be used to remove excess calcium from the release water, making the release water more suitable for release back into the environment and/or the extraction process. At step 318, the cake is removed from the system via a truck, belt, or other transportation means and is transferred to a deposit site.

EXAMPLES

FIGS. 4-12 show results of examples and tests that corroborate the embodiments described above. Each of the FIGS. 4-12 are described in detail below and include tests run at different dosages (e.g., ppm) of calcium oxide or calcium hydroxide.

Figure 4:
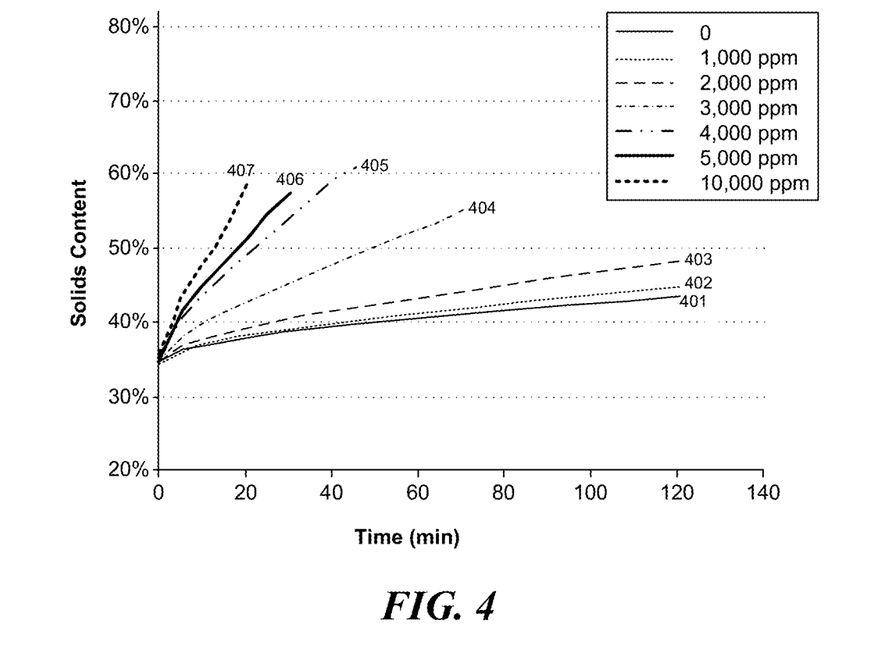
FIG. 4 is a graph that shows the effect of lime concentration on the solids content of a lime-tailings mixture.

FIG. 4 is a graph that shows the effect of lime concentration in the lime-tailings mixture on the solids content of an FFT tailing sample. The slope of each line in the graph is indicative of the dewatering rate of that specific sample as it shows the change in the solids content of the mixture over time. Table 1 includes pH levels associated with the different dosages described below for FIG. 4.

TABLE 1 pH levels associated with lime dosages in FIG. 4

| Lime Dosage | Mineral Solids Content % |
|---|---|
| 0 | 8.24 |
| 1,000 | 9.37 |
| 2,000 | 10.76 |
| 3,000 | 11.91 |
| 4,000 | 12.22 |
| 5,000 | 12.34 |
| 10,000 | 12.45 |

As shown in FIG. 4, a tailings stream that contains no lime additive (e.g., line 401) will have a very slow dewatering rate and will have lowest solids content at each time interval. This is in part because the high sodium levels on the surface of the Kaolinite clay hold water tightly which promotes dispersion and prevents settling. A lime-tailings mixture that has a lime concentration of 1,000 parts per million (ppm) (e.g., line 402) has a slightly higher solids content at each time interval than the mixture that has zero lime additive but the difference is relatively minor. As more lime is added to the lime-tailings mixture, the dewatering rate, and therefore the solids content at each time interval, increases. The lime-tailings mixture with a lime concentration of 2,000 ppm (e.g., line 403) has a noticeably steeper slope than line 402, which is indicative of a higher dewatering rate. As seen in Table 1, at a dose of 2000 ppm the pH was below the 11.5 threshold for cation exchange to occur. Similarly, the lime-tailings mixture with a lime concentration of 3,000 ppm (e.g., line 404) is even steeper. The pH of this 3,000 ppm dosage was 11.91 which indicated that cation exchange was beginning. Lines 405, 406, and 407, which represent mixtures with lime concentrations of 4,000 ppm, 5,000 ppm, and 10,000 ppm, respectively, are even steeper still. The pH of these dosages were in the range of pozzolanic reactions from 12.2 to 12.45. As shown by the graph in FIG. 4, as the concentration of lime additive in the lime-tailings mixture increases, the dewatering rate continues to increase and the solids content at each time interval increases.

Figure 5:
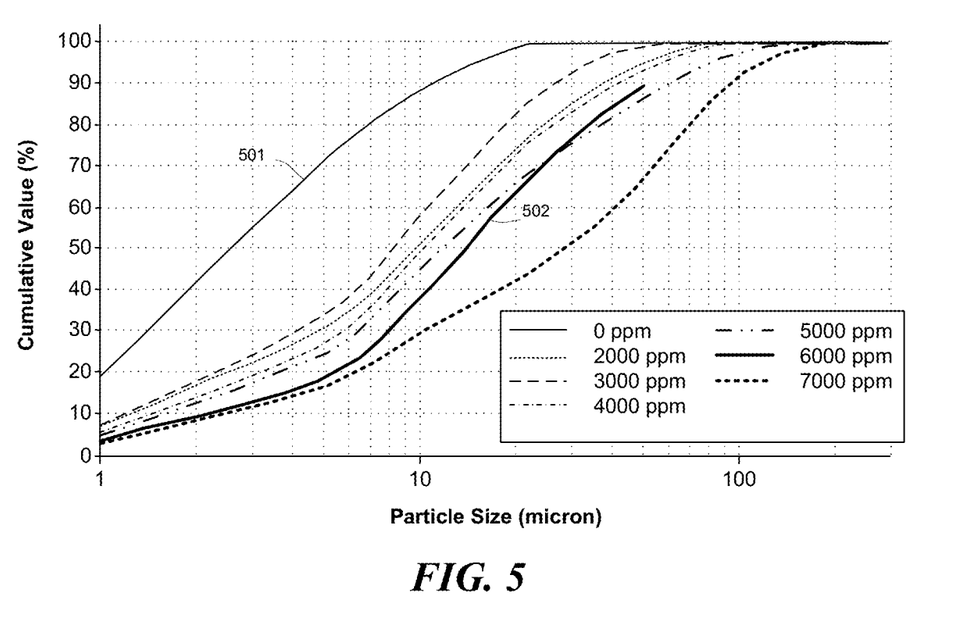
FIG. 5 is a graph that shows the effect of lime concentration on particle size of solids in a lime-tailings mixture.

FIG. 5 is a graph showing the relationship between the concentration of lime additive in the lime-tailings mixture and the particle size of the solids in the lime-tailings mixture. The horizontal axis of the graph represents the size of a given particle on a logarithmic scale and the vertical axis shows the cumulative percentage of the particles at each particle size for a given sample. In other words, each point on a given line represents the percentage of particles in a given sample that have a particle size equal to or less than that particular particle size of the graph. For example, line 501 represents the particle size distribution of particles in a sample of the lime-tailings mixture that has a lime additive concentration of 0 ppm. For the 0 ppm sample, 19.5% of all particles in the sample have a particle size that is less than or equal to 1 micron (µm), 42% have a particle size less than or equal to 2 µm, 72% have a particle size less than or equal to 5 µm, and 88% have a particle size less than or equal to 10 µm. For the 6000 ppm sample (e.g., line 502), 4% of all particles in the sample have a particle size that is less than or equal to 1 µm, 9% have a particle size less than or equal to 2 µm, 39% have a particle size less than or equal to 10 µm, and 84% have a particle size less than or equal to 40 µm. In general, samples that have a greater percentage of particles with higher particle sizes are represented by lines that are further to the right in the graph in FIG. 5.

Furthermore, the steepness of the slope of a line at a given particle size is indicative of the number of particles in the sample that have that particle size, such that the number of particles for a point on a line that has a steep slope is greater than the number of particles for a different point on the line that has a shallow slope. As can be seen by FIG. 5, the lime-tailings mixture samples that have higher concentrations of lime additive tend to have steep slopes at larger particle sizes than lime-tailings mixture samples with lower concentrations of lime additive. The graph of FIG. 5 shows that increasing the pH of a tailings stream by adding additional lime additive to a lime-tailings mixture substantially increases the particle size of solid particles in the lime-tailings mixture. In one embodiment, the increased particle size may be about 100 microns or larger. This increased particle size can facilitate the dewatering process.

Figure 6:
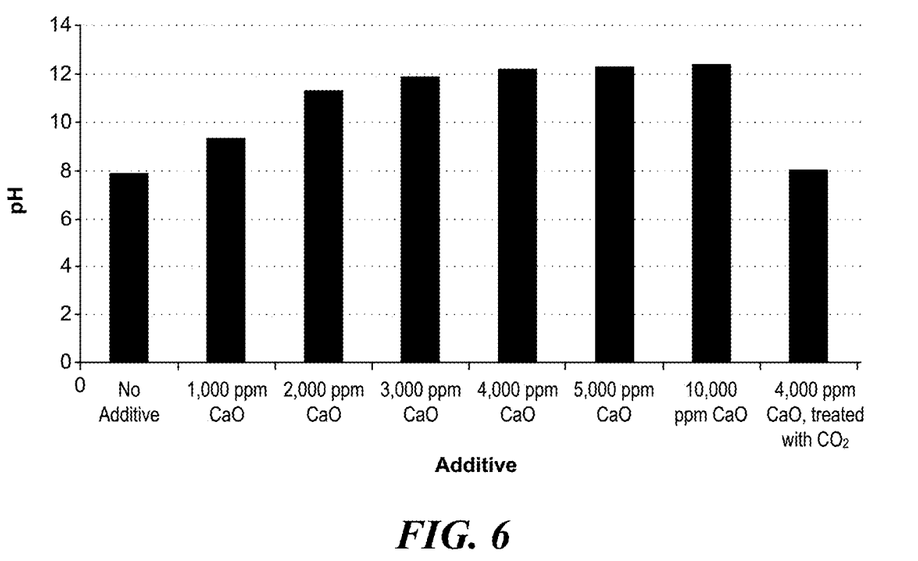
FIG. 6 is a bar graph that shows the measured pH levels of a lime-tailings mixture as a function of the concentration of lime in a lime-tailings mixture.

FIG. 6 is a bar graph that shows the measured pH levels of a lime-tailings mixture as a function of the concentration of lime in the mixture. When the lime-tailings mixture has no lime (e.g., no additive has been added to the oil sands tailing stream), the pH of the stream is about 7.9. When the lime-tailings mixture has a lime concentration of 1,000 ppm, the pH of the mixture is about 9.2. As the concentration of lime in the mixture continues to increase, the pH of the mixture continues to increase, although the rate of change in pH level begins to diminish as the pH level rises with increased lime concentration. For example, as shown in FIG. 6, the difference in pH level between a lime-tailings mixture with a lime concentration of 5,000 ppm is only slightly more than the pH of a mixture with a lime concentration of 4,000 ppm and only slightly less than the pH of a mixture with a lime concentration of 10,000 ppm. As the pH of the mixture approaches 12.3, the pozzolanic reactions between the dissolved calcium cations and the Kaolinite occur more readily, causing the dewatering rate to increase, as previously described. This reaction causes calcium silicate hydrate, and aluminum hydrate particles to form on the surface of the Kaolinte which enhances dewatering.

The far right column of the graph shown in FIG. 6 shows the pH of a mixture that has a lime concentration of 4,000 ppm and that has been subsequently exposed to and treated with $CO_2$. As previously described, $CO_2$ that has been added to the mixture will readily react with dissolved calcium cations to form insoluble calcium carbonate and water, as shown in reactions 3 and 4 above. When the treatment and dewatering of a lime-tailings mixture has finished, dissolved calcium ions from the lime additive that did not react with the carbonates or clay in the tailings may remain dissolved in the water. The presence of the dissolved calcium cations in the water ensures that the pH level of the water remains at or near the elevated level of 12.3, which is too high to safely release back into the environment. Over the course of a few weeks, atmospheric $CO_2$ will react with the dissolved calcium cations and the pH level of the release water will decrease. Alternatively, $CO_2$ may be actively introduced to the release water in order to reduce the soluble calcium and the pH level, allowing for recycling this water to the extraction process or water release back into the environment. In the example shown in FIG. 6, introducing $CO_2$ to a lime-tailings mixture that has a lime concentration of 4,000 ppm reduces the pH of the mixture from 12.2 to about 8.0, which is almost identical to the pH level of the tailings stream that had no lime additive.

Figure 7:
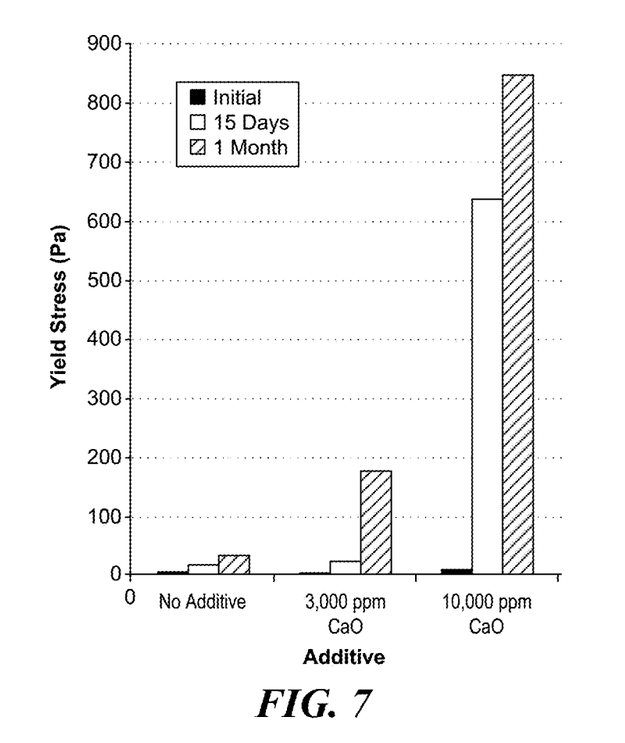
FIG. 7 is a bar graph that shows the relationship of the yield stress of solids in a lime-tailings mixture to both the concentration of lime and the dewatering time.

FIG. 7 is a bar graph that shows the dependency of the yield stress of tailings on (a) the concentration of lime in the lime-tailings mixture and (b) time. The yield stress is defined as the stress of a material at which the material begins to plastically deform, and is representative of the solids content of the lime-tailings mixture. As shown in FIG. 7, the initial yield stress of oil sands tailings that have no lime additive added is about 4 Pascal (Pa). After 15 days, the yield stress has increased to about 15 Pa, and after 1 month, the yield stress is about 30 Pa. For the lime-tailings mixture that has a lime concentration of 3,000 ppm, the yield stress is about 4 Pa at the initial stage when the dewatering process begins, about 23 Pa after 15 days, and about 180 Pa after 1 month. For the lime-tailings mixture that has a lime concentration of 10,000 ppm, the yield stress of the mixture is about 8 Pa at the initial stage, about 640 Pa after 15 days, and about 850 Pa after 1 month. In general, increasing the amount of lime additive added to oil sands tailings and increasing the length of time that dewatering is allowed to occur will both lead to an increased yield stress of a lime-tailings mixture. High doses of lime resulted in higher yield stress because of pozzolanic reactions that occurred. The pozzolanic reaction produces a weak cementitious material that gradually gains strength over time. This chemical modification increases the stress level needed to plastically deform reclaimed tailings which is beneficial for successful reclamation.

Figure 8:
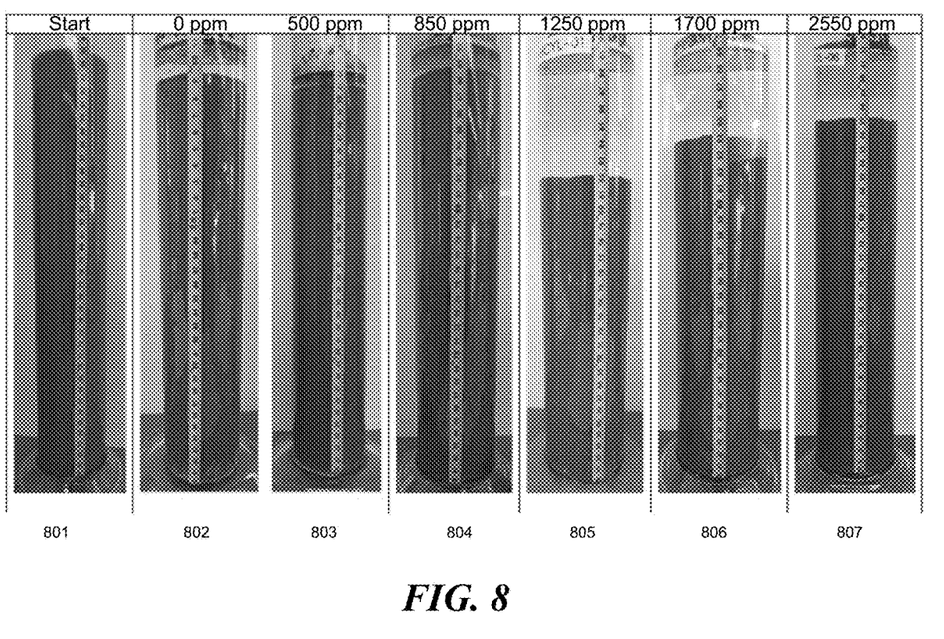
FIG. 8 is an image that shows the relationship of the lime-tailings mixture and the concentration of lime in a lime-tailings mixture.

FIG. 8 is an image that shows the relationship of the lime-tailings mixture and the concentration of lime in the lime-tailings mixture. Sample 801 is representative of the starting appearance for each of the samples. Each of the samples were virtually identical at the start of dewatering process and each image was taken three weeks after starting the dewatering process. The only difference between each of the samples was the quantity of lime additive mixed in with the oil sands tailings. Sample 802 has 0 ppm of lime additive. As can be seen from the amount of clear liquid at the top of sample 802, a small amount of solid has separated from the water and the clear liquid (e.g., the release water) has accumulated at the top. Samples 803 and 804 have lime additive concentrations of 500 ppm and 850 ppm, respectively. Even though lime additive has been added to these samples, there is little noticeable change in appearance. This is in part because the concentration of lime additive has not increased the pH of the system enough to have an appreciable effect on the dewatering and settling rate. Sample 805 has a lime additive concentration of 1250 ppm, which corresponds to a pH level of about 11.0. At this concentration and pH, the amount of clear water in the sample has significantly increased due to increased settling of solid particulate matter in the sample. As previously described, enhanced settling of the solids in the lime-tailings mixture begins around a pH of 11.0 in part because there was a noticeable increase in the amount of soluble calcium in the water, suggesting that calcium cations were reacting with sodium and potassium on the surface of the tailings through cation exchange. As the calcium hydroxide dose increased beyond 1250 ppm, the settling rate of the mixture was observed to decrease, despite the presence of additional soluble calcium in the water and larger particle size. It appears that the limited settling at high lime dose could be related to the interaction of lime with residual organics in the process water.

In addition to the enhanced settling and dewatering caused by pozzolanic reactions between lime and Kaolinite clay, there may be other reactions occurring at elevated pH levels that further enhance the settling and dewatering process of the oil sands tailings. For example, adding lime to a tailings stream may also be useful in the removal of the naphthenic acid from the tailings process water. Naphthenic acids, which are soluble in the bitumen extraction process water and are often found in oil sands tailings, are toxic and unsuitable for release back into the environment. With lime addition up to a pH of 11.0, bitumen particles release from the surface of clay particles in the lime-tailings and float to the surface. As more lime is added and the pH level increases, newly-freed calcium cations may react with naphthenic acids in the mixture to form calcium naphthenate particles, which is an insoluble solid that is slightly denser than water. The calcium naphthenate solids will fall to the bottom of the oil tailings mixture along with the rest of the dewatered solid material.

Additional tests using four FFT stream samples (e.g., FFT 1-4) were run to corroborate the findings described above. Each FFT sample was separated into seven separate test samples and calcium hydroxide was mixed into each test sample to provide a calcium hydroxide ($Ca(OH)_2$) concentration of 0 ppm, 1,000 ppm, 2,000 ppm, 3,000 ppm, 4,000 ppm, 5,000 ppm, or 10,000 ppm. These concentrations correspond to pH levels as shown in FIG. 12 (e.g., 1,000 ppm corresponds to a pH of about 9.37). Table 2 (below) shows the original composition of the four FFT streams before $Ca(OH)_2$ was added, and FIGS. 9-12 show the relationship between the $Ca(OH)_2$ concentration in a FFT stream and the dewatering ability of the FFT stream.

TABLE 2

Fluid fine tailings sample properties

| FFT | Mineral Solids Content % | Bitumen Content % | Methylene Blue Index | Clay % | $Na^+$ (ppm) | Carbonate Alkalinity (ppm) | pH |
| --- | --- | --- | --- | --- | --- | --- | --- |
| 1 | 32.5 | 2.9 | 9.2 | 66 | 362 | 579 | 7.9 |
| 2 | 33.4 | 1.3 | 11.2 | 80 | 877 | 937 | 8.3 |
| 3 | 33.8 | 1.5 | 9.9 | 71 | 827 | 860 | 7.6 |
| 4 | 39.6 | 1.5 | 8.6 | 62 | 894 | 782 | 7.7 |

Figure 9:
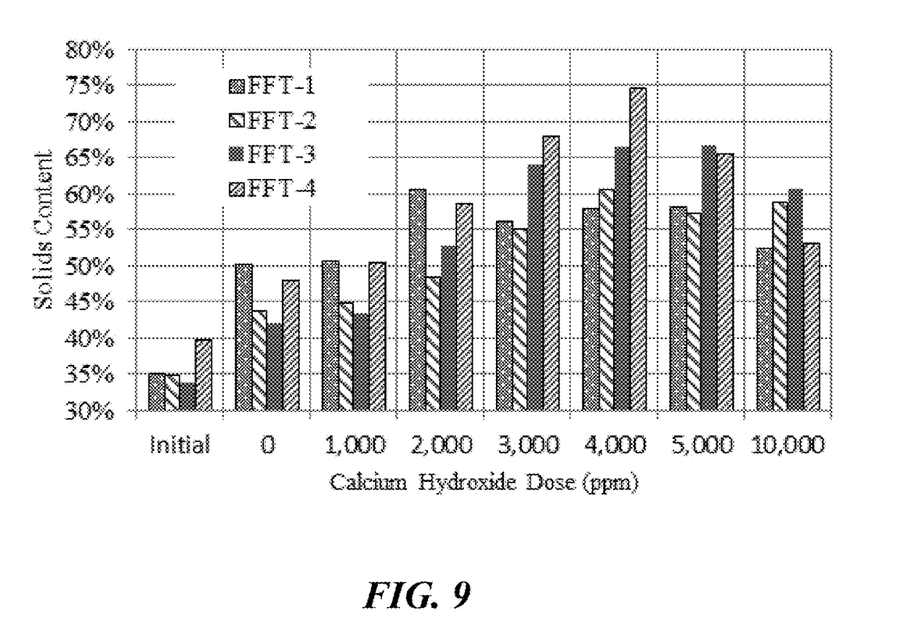
FIG. 9 is a bar graph that shows the relationship between the solids content of the separated cake material and concentration of lime.

FIG. 9 is a bar graph that shows the solids content of the separated cake material after treating the FFT sample with different dosages of $Ca(OH)_2$ and undergoing pressure filtration. In this test, 150 grams of FFT-1, FFT-2, FFT-3, and FFT-4 at each dosage were each subjected to 100 psi air pressure for up to 120 minutes. A Whatman 50, 2.7 μm filter was used to separate water from the solids for each FFT sample. The dosages of $Ca(OH)_2$ tested for each FFT sample included 0 ppm, 1,000 ppm, 2,000 ppm, 3,000 ppm, 4,000 ppm, 5,000 ppm, and 10,000 ppm. Additionally, an initial measurement was taken from each FFT sample to show the effect of the pressure filtration on the solids content of cake. As shown in FIG. 9, the average measured solids content of the cake extracted from the initial sample was about 36%. After being pressurized for up to 120 minutes, the solids content of cake extracted from the seven test samples was measured. The solids content of the cake extracted from the 0 ppm $Ca(OH)_2$ test samples was about 46% on average, indicating that the solids content of the cake increased by about 10%. For the 1,000 ppm, 2,000 ppm, 3,000 ppm, and 4,000 ppm $Ca(OH)_2$ test samples, the average solids content increased along with the $Ca(OH)_2$. Specifically, the average solids contents for the 1,000 ppm dosage corresponded to about 47%, the 2,000 ppm dosage corresponded to about 57%, the 3,000 ppm dosage corresponded to about 61%, and the 4,000 ppm dosage corresponded to about 65%. The 5,000 ppm and 10,000 ppm $Ca(OH)_2$ test samples indicated a decrease in the solids content of the extracted cake material to about 61% and 56%, respectively. Notably, though, the testing of the 5,000 ppm and 10,000 ppm samples was ended prematurely due to issues with the testing apparatus so the reported solids content shown in FIG. 9 for these samples may be underestimated. This overall data suggests that a concentration of $Ca(OH)_2$ in FFT samples from about 4,000-5,000 ppm may be the ideal concentration to ensure that the solids content of extracted cake material is highest.

Figure 10:
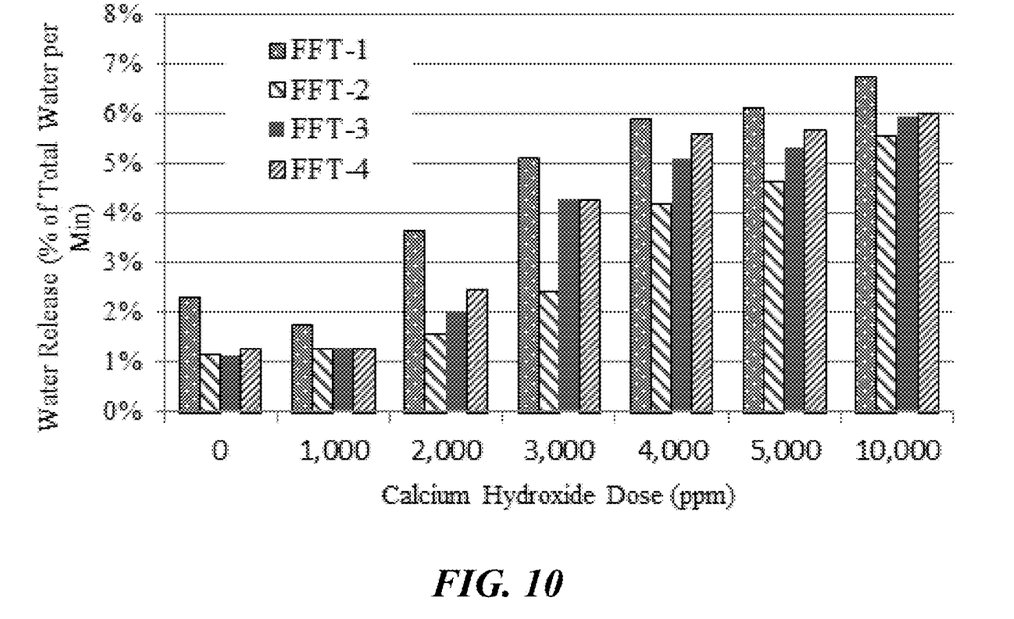
FIG. 10 is a bar graph that shows the relationship between the concentration of lime in a lime tailings mixture and the rate at which release water is separated from an FFT sample using pressure filtration.

FIG. 10 is a bar graph that shows the relationship between the concentration of $Ca(OH)_2$ in a lime tailings mixture and the rate at which release water is separated from an FFT sample using pressure filtration. The testing conditions that produced the results shown in FIG. 10 were identical to the testing conditions previously described with reference to FIG. 9. For test samples with 0 ppm $Ca(OH)_2$ mixed into the FFT samples, release water separated from the FFT samples at a rate of about 1.4% of total water present in the test sample per minute. For test samples with a 1,000 ppm $Ca(OH)_2$ concentration, the average release water separation rate stayed at about 1.4% of total water per minute. The 2,000 ppm $Ca(OH)_2$ test samples had an average release water separation rate increase to about 2.4%, and the 3,000 ppm and 4,000 ppm $Ca(OH)_2$ samples had average release water separation rates at about 4.0% and 5.2%, respectively. For the 5,000 ppm and 10,000 ppm $Ca(OH)_2$ test samples, the average release water separation rate also increased to about 5.5% and 6.1%, respectively, although the amount of the average rate increase was less. This overall data suggests that the addition of $Ca(OH)_2$ (e.g., lime) to tailings streams can be beneficial in increasing the dewatering rate of tailings.

Figure 11:
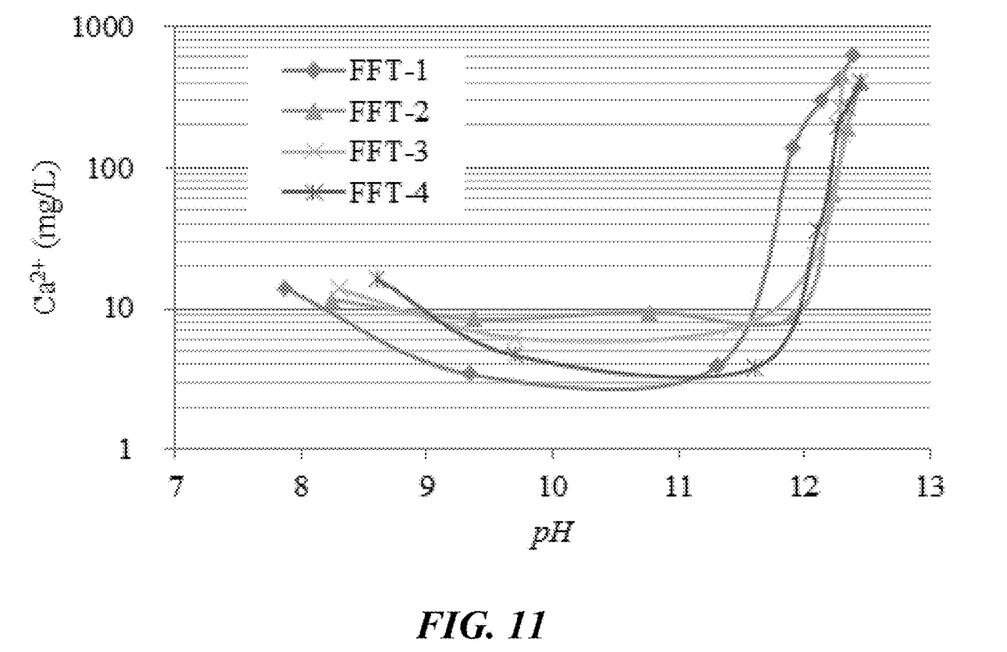
FIG. 11 is a graph that shows the effect of pH on the number of free calcium cations in a lime-tailings mixture.
Figure 12:
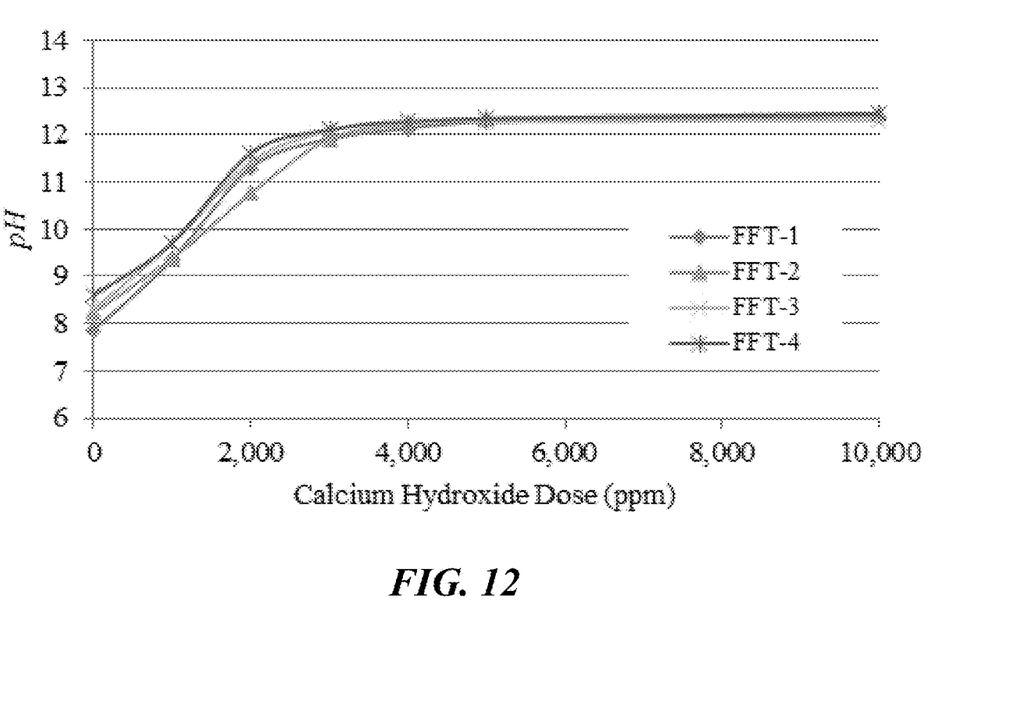
FIG. 12 is a graph that shows the relationship between the pH of a lime-tailings mixture and the concentration of lime in a lime-tailings mixture.

FIG. 11 is a graph that shows how the number of free calcium cations ($Ca^{2+}$) (e.g., from $Ca(OH)_2$) in a test sample is dependent on the pH of the test sample. As shown in FIG. 11, as pH levels increase up to about 11.5, the number of free calcium cations dissolved in the FFT samples' solution decreases. As previously described, this is at least in part because the cations react with the sodium and potassium bicarbonates to form calcium carbonate. However, once the pH of the test samples reaches about 11.5, the number of free calcium cations in the test samples increase because the bicarbonates are being depleted. The amount of calcium cations continued to increase throughout the test. As the test sample reached a pH of about 12.3, the rate of increase of the calcium cations begins to slowly decrease. As previously described, this could be in part due to the pozzolanic reactions, which begin to occur at pH of about 12.0.

FIG. 12 is a graph that shows the relationship between the pH and the concentration of lime in a lime-tailings mixture for each of the FFT-1, FFT-2, FFT-3, and FFT-4 streams. The relationship between the pH and the calcium hydroxide dosages shown in FIG. 12 also apply to FIGS. 9-11. As shown in FIG. 12, a 0 ppm $Ca(OH)_2$ dosage, the pH level for each of the FFT test samples is about 8.3. At a 2,000 ppm $Ca(OH)_2$ dosage, there is a steady increase in the pH level of the test samples to about 11.3, after which the rate of change of the pH level decreases. For test samples with a $Ca(OH)_2$ concentration of 3,000 ppm and 4,000 ppm, the average pH levels are about 12 and 12.2, respectively. Test samples with a $Ca(OH)_2$ of 5,000 ppm and 10,000 ppm maintain a pH level of about 12.3 and about 12.4, respectively. This test indicates that increasing the $Ca(OH)_2$ concentration above 4,000 ppm has little effect on the pH of the tailings, suggesting that the maximum acquirable pH level for a lime-tailings mixture is less than about 12.5. This finding is congruent with the results shown in FIG. 9, which shows that a $Ca(OH)_2$ concentration of about 4,000 ppm is the preferred $Ca(OH)_2$ concentration to promote enhanced dewatering.

From the foregoing, it will be appreciated that specific embodiments of the invention have been described herein for purposes of illustration, but that various modifications may be made without deviating from the scope of the invention. Additionally, aspects of the invention described in the context of particular embodiments or examples may be combined or eliminated in other embodiments. Although advantages associated with certain embodiments of the invention have been described in the context of those embodiments, other embodiments may also exhibit such advantages. Additionally, not all embodiments need necessarily exhibit such advantages to fall within the scope of the invention. Accordingly, the invention is not limited except as by the appended claims.

EXAMPLES OF THE PRESENT TECHNOLOGY

The subject technology is illustrated, for example, according to various aspects described below. Various examples of aspects of the subject technology are described as numbered clauses (1, 2, 3, etc.) for convenience. These are provided as examples and do not limit the subject technology. It is noted that any of the dependent clauses may be combined in any combination, and placed into a respective independent clause, e.g., clause (1, 14, 27, etc.). The other clauses can be presented in a similar manner.

1. A method for treating oil sands tailings, the method comprising:
  mixing a tailings stream with a lime additive to produce a lime-tailings mixture having a pH of about 11.0 or greater; and
  dewatering the lime-tailings mixture to produce a cake including at least 55% solids by total weight.

2. The method of claim 1 wherein the lime-tailings mixture has a pH of about 12.0 or greater.

3. The method of claim 1 wherein the lime tailings mixture has a pH of about 12.5.

4. The method of claim 1 wherein the lime additive is a lime slurry including one or more of hydrated lime, quicklime, enhanced hydrated lime and dolomitic lime.

5. The method of claim 1 wherein the lime additive includes quicklime, and wherein the quicklime is calcium oxide.

6. The method of claim 1 wherein the lime additive includes hydrated lime, and wherein the hydrated lime is calcium hydroxide.

7. The method of claim 1 wherein the lime additive includes a dolomitic lime including at least 25% magnesium.

8. The method of claim 1 wherein the lime additive includes a lime slurry comprising less than 15% lime by total weight.

9. The method of claim 1 wherein the lime additive includes a lime slurry comprising less than 10% lime by total weight.

10. The method of claim 1 wherein the lime additive includes a lime slurry comprising less than 5% lime by total weight.

11. The method of claim 1 wherein dewatering includes filtering the lime-tailings mixture via pressure or vacuum filtration.

12. The method of claim 1 wherein dewatering includes centrifuging the lime-tailings mixture via a scroll centrifugation unit.

13. The method of claim 1 wherein the cake has a composition that includes at least about 60% solids by weight, at least about 65% solids by weight, at least about 70% solids by weight, at least about 80% solids by weight, at least about 85% solids by weight, or at least about 90% solids be weight.

14. The method of claim 1 wherein dewatering the lime-tailings mixture includes producing a release water that includes 5% or less solids by weight.

15. The method of claim 14, further comprising recycling the release water to be mixed with the tailings stream prior to mixing the tailings stream with the lime additive.

16. The method of claim 15 wherein recycling the release water increases the pH of the tailings stream prior to the tailings stream being mixed with the lime additive.

17. The method of claim 15 wherein recycling the release water includes reacting calcium ions present in the release water with carbonates present in the tailings stream.

18. The method of claim 17 wherein recycling the release water decreases the amount of lime additive needed to be mixed with the tailings stream.

19. The method of claim 1 wherein mixing includes mixing the tailings stream with the lime additive for at least 90-300 seconds.

20. The method of claim 14, further comprising treating the release water with carbon dioxide to remove excess calcium.

21. The method of claim 14, further comprising depositing the release water into a pond.

22. The method of claim 1 wherein the oil sands tailings comprise whole tailings, thin fluid tailings, thickened tailings, fluid fine tailings and/or mature fine tailings.

23. The method of claim 1 wherein the oil sands tailings are from a tailings pond.

24. The method of claim 1 wherein the oil sands tailings comprise about 10-50% solids by total weight.

25. The method of claim 1 wherein mixing does not include using a polymer.

26. The method of claim 1 wherein lime is the only additive mixed with the tailings stream before dewatering.

27. A method for dewatering oil sands tailings comprising:
providing a tailings stream including 10-55% solids by total weight;
increasing the pH of the tailings stream by combining the tailings stream with lime to produce a lime-tailings mixture having a pH of at least 11.0; and
dewatering the lime-tailings mixture to produce a first stream having 10% or less solids by total weight and a second stream having 50% or more solids by total weight.

28. The method of claim 27 wherein the first stream is a release water stream and the second stream is a cake.

29. The method of claim 27 wherein the tailings stream includes particles having an average first particle size, and wherein increasing the pH of the tailings stream includes increasing a particle size of the particles to have an average second particle size larger than the average first particle size.

30. The method of claim 29 wherein the average second particle size is about 25 microns or larger.

31. The method of claim 29 wherein the increased particle size facilitates dewatering.

32. A method for treating tailings, the method comprising:
providing a tailings stream having 10-55% solids by total weight and a first pH;
adding lime to the tailings stream to produce a lime-tailings mixture having a second pH higher than the first pH; and
dewatering the lime-tailings mixture using pozzolanic reactions to produce a first stream having 10% or less solids by total weight and a second stream having 50% or more solids by total weight.

33. The method of claim 32 wherein the tailings includes silicic acid or aluminate, and wherein dewatering the lime-tailings mixture using pozzolanic reactions include reacting the lime with the silicic acid or aluminate.

34. The method of claim 33 wherein the lime is quicklime and/or hydrated lime.

35. The method of claim 34 wherein reacting quicklime with silicic acid forms calcium silicate hydrate.

36. The method of claim 34 wherein reacting quicklime with aluminate functional groups forms calcium aluminate hydrate.

37. The method of claim 32 wherein adding the lime to the tailings stream induces the formation of insoluble calcium naphthenates.

Additional features and advantages of the subject technology are described below, and in part will be apparent from the description, or may be learned by practice of the subject technology. The advantages of the subject technology will be realized and attained by the structure particularly pointed out in the written description and claims hereof as well as the appended drawings.

We claim:

1. A method for treating oil sands tailings, the method comprising:
receiving an oil sands tailings composition comprising clay, bicarbonates, and at least 10% solids by weight; and
adding at least 3,000 ppm of lime to the tailings composition to produce a lime-tailings mixture having a pH of at least about 12.0 and soluble calcium cations, wherein the calcium cations are configured to modify the clay via pozzolanic reactions at the pH of at least about 12.0.

2. The method of claim 1, wherein, when the clay is modified via the pozzolanic reactions, the lime-tailings mixture is substantially free of bicarbonates.

3. The method of claim 1, wherein adding the lime to the tailings composition causes the calcium cations to react with the bicarbonates such that the lime- tailings mixture is substantially void of bicarbonates.

4. The method of claim 1, wherein the lime-tailings mixture has a pH of at least about 12.5.

5. The method of claim 1, wherein the lime comprises calcium hydroxide.

6. The method of claim 1, further comprising dewatering the lime-tailings mixture to produce a cake comprising at least 40% solids by weight.

7. The method of claim 6, wherein dewatering comprises filtering the lime-tailings mixture via pressure or vacuum filtration.

8. The method of claim 6, wherein dewatering comprises centrifuging the lime-tailings mixture via a scroll centrifugation unit.

9. The method of claim 1, further comprising mixing the tailings composition with the lime for at least 90-300 seconds.

10. The method of claim 1, wherein the oil sands tailings comprise at least one of whole tailings, thin fluid tailings, thickened tailings, fluid fine tailings, or mature fine tailings.

11. The method of claim 1, wherein the lime comprises calcium hydroxide, individual calcium hydroxide particles comprising a specific surface area of at least 30 $m^2/g$.

12. A method for dewatering oil sands tailings comprising:
    providing a tailings composition from oil sands operations, the tailings composition including clay and at least 10% solids by weight; and
    increasing the pH of the tailings composition to at least 12.0 by adding at least 3,000ppm of lime to produce a lime-tailings mixture, wherein adding the lime causes the lime-tailings mixture to have excess soluble calcium cations at the pH of at least 12.0, and
    wherein, when the lime-tailings mixture has a pH of at least 12.0, the excess soluble calcium cations are configured to modify the clay via pozzolanic reactions.

13. The method of claim 12, wherein, when the clay is modified via pozzolanic reactions, the lime-tailings mixture has substantially no bicarbonates.

14. The method of claim 12, wherein the clay comprise comprises kaolinite, and wherein, when the pH of the lime-tailings mixture is at least above 12.0, the soluble calcium cations react with the kaolinite to form a calcium-comprising hydrate.

15. The method of claim 12, wherein the clay comprise comprises kaolinite, and wherein modifying the clay via pozzolanic reactions comprises increasing the particle size of the kaolinite.

16. The method of claim 12, wherein the clay comprise comprises kaolinite, and wherein modifying the clay comprises increasing a water layer of the kaolinite.

17. The method of claim 12, wherein the lime-tailings mixture does not include a polymer.

18. A method for treating oil sands tailings, the method comprising:
    providing an oil sands tailings composition having clay and at least 10% solids by weight; and
    adding lime having a concentration of at least 3,000 ppm to the tailings composition to produce a lime-tailings mixture having a pH of at least about 12.0 and soluble calcium cations, wherein adding the lime to the tailings composition causes the soluble calcium cations to modify the clay of the tailings composition via pozzolanic reactions.

19. The method of claim 18, wherein the tailings composition comprises bicarbonates, and wherein, when the clay is modified via pozzolanic reactions, the lime-tailings mixture is substantially free of bicarbonates.

20. The method of claim 18, wherein the tailings composition comprises bicarbonates, and wherein adding the lime to the tailings composition causes the calcium cations of the lime to react with the bicarbonates such that the lime-tailings mixture is substantially void of bicarbonates.

* * * * *